Oct. 27, 1953

M. M. CLARK ET AL
MILEAGE INDICATING ATTACHMENT
FOR SELF-PROPELLED VEHICLES 2,657,285

Filed June 22, 1951

INVENTOR
MARTHA M. CLARK,
ROYAL E. HANSEN,

BY
McMorrow, Berman & Davidson
ATTORNEYS

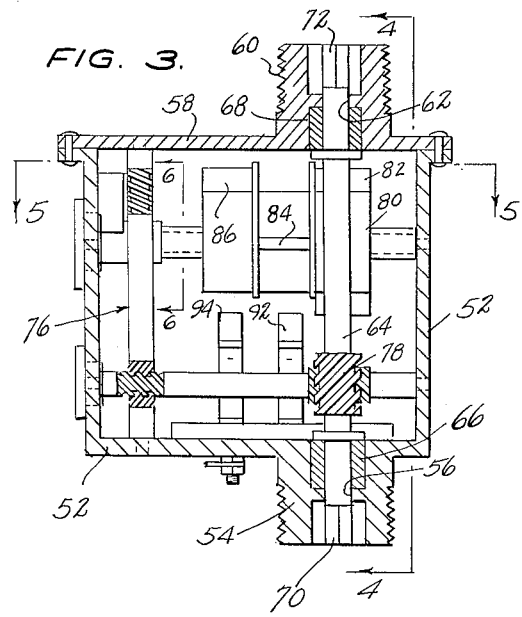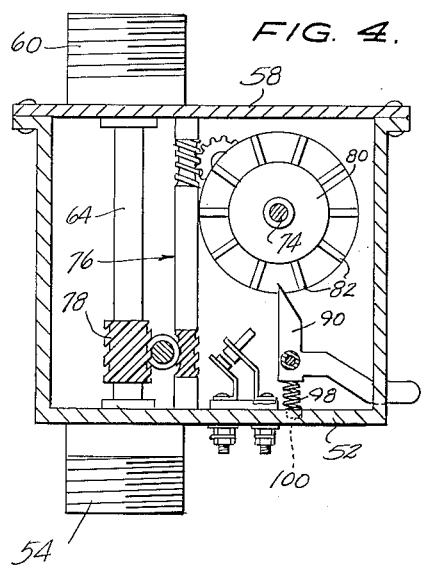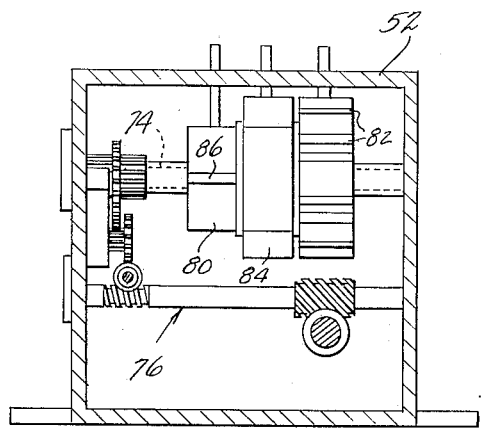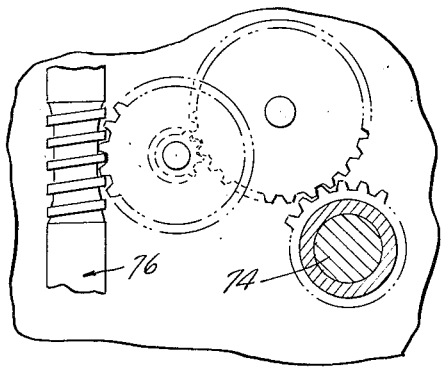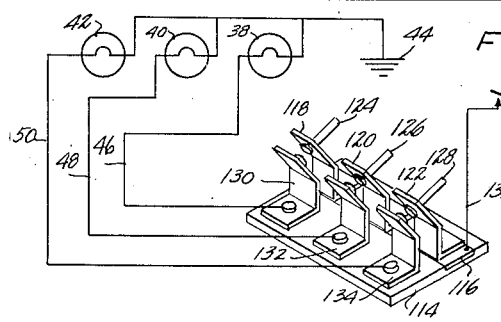

Patented Oct. 27, 1953

2,657,285

UNITED STATES PATENT OFFICE 2,657,285

MILEAGE INDICATING ATTACHMENT FOR SELF-PROPELLED VEHICLES

Martha M. Clark and Royal E. Hansen,
Eel Rock, Calif.

Application June 22, 1951, Serial No. 233,078

1 Claim. (Cl. 200—52)

This invention relates to an attachment for a self-propelled vehicle, and has for its primary object to signal to the driver of the vehicle when lubrication of the various working elements is due.

Another object is to effect the mounting of the attachment on the vehicle without requiring alterations thereof.

A further object is to produce a signal that remains before the driver whenever the ignition system of the vehicle is turned on until it is manually discontinued by the vehicle operator or by the serviceman by whom the servicing of the vehicle has been performed.

The above and other objects may be attained by employing this invention which embodies among its features a group of signal lamps mounted on a vehicle within the range of vision of the vehicle operator, circuit closers carried by the vehicle and having electrical connection with the signal lamps, a lever mounted to rock adjacent each circuit closer and to close a circuit therethrough and through its respective signal lamp, and means operatively connected to the traction wheels of the vehicle and periodically engaging the levers for moving said levers and lighting the signal lamps.

Other features include a spring bearing on each lever to hold said lever in and out of engagement with a circuit closer and a trip arm on each lever for retracting it from engagement with its respective circuit closer.

Still other features include a group of drums mounted to rotate about a common axis, means for coupling the drums to the speedometer cable of a vehicle and radial arms on the drums for engaging the levers and moving them to close the circuit closers and light the signal lamp.

In the drawings:

Figure 3 is an enlarged vertical sectional view taken substantially on the line 3—3 of Figure 1;

Figure 4 is a sectional view taken substantially on the line 4—4 of Figure 3;

Figure 5 is a horizontal sectional view taken substantially on the line 5—5 of Figure 3;

Figure 6 is an enlarged fragmentary sectional view taken substantially on the line 6—6 of Figure 3;

Figure 8 is a view showing the wiring diagram.

Figure 1:
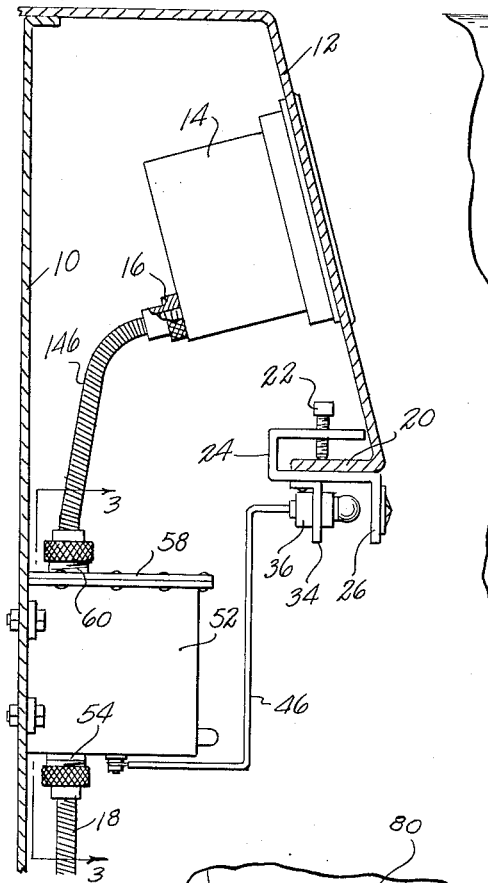
Figure 1 is a fragmentary sectional view through the dash and instrument boards of a conventional self-propelled vehicle showing this mileage indicator in operative position thereon.
Figure 2:
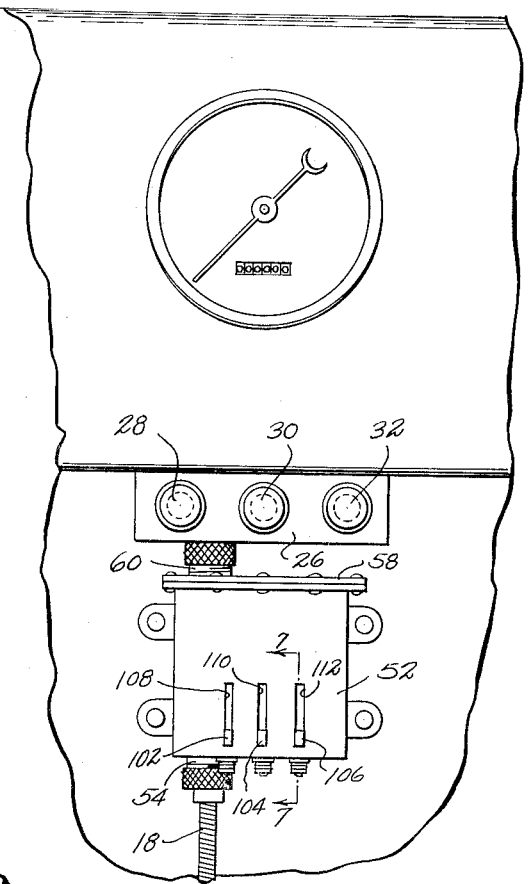
Figure 2 is a fragmentary front view of the device illustrated in Figure 1.
Figure 7:
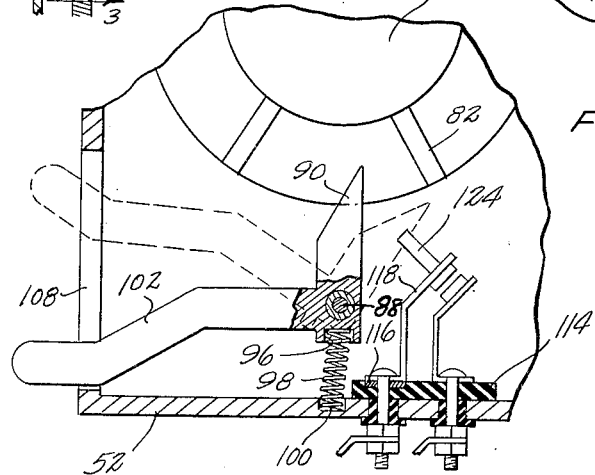
Figure 7 is an enlarged fragmentary sectional view taken substantially on the line 7—7 of Figure 2.

Referring to the drawings in detail, a conventional self-propelled vehicle is equipped with a dashboard 10 and an instrument board 12 carrying a conventional speedometer 14 which carries a threaded nipple 16 to which the conventional speedometer drive cable is connected. In the ordinary construction, the instrument board 12 is provided at its lower edge with a flange 20.

Clamped to the flange 20 by a suitable set screw 22 is a substantially U-shaped bracket 24 carrying a downwardly extending flange 26 having spaced openings extending therethrough for the reception of colored glass disks 28, 30 and 32. Carried by the bracket 24 behind the flange 26 is a depending flange 34 in which lamp sockets 36 are supported. These lamp sockets form supports for lamps 38, 40 and 42 (Figure 8), one terminal of each of which is grounded, as at 44, while conductors 46, 48 and 50 are respectively connected to the opposite terminals thereof.

Mounted on the dashboard 10 near the flange 20 is a hollow, substantially rectangular housing 52 carrying on its bottom wall a downwardly extending, externally threaded nipple 54 having an axial bore 56 extending therethrough. A cover plate 58 closes the upper open end of the housing 52 and carries an upwardly extending, threaded nipple 60 having an axial bore 62 extending therethrough in alignment with the bore 56 of the nipple 54. A main drive shaft 64 is mounted in bearings 66 and 68 carried by the housing 52 and cover plate 58, respectively, for rotation about the axis of the bores 56 and 62, the opposite ends of the drive shaft 64 polygonal terminals 70 and 72 for a purpose to be more fully hereinafter described.

Mounted within the housing for rotation about a substantially horizontal axis is a drum shaft 74 which is connected through a suitable speed reduction gear train, designated generally 76, with a worm drive gear 78 carried by the main drive shaft 64 intermediate the ends thereof. Mounted on the shaft 74 for rotation therewith is a drum or rotor 80 carrying longitudinally spaced, radially extending arms 82, 84 and 86. In the preferred form of the invention there are ten arms 82, two arms 84, and one arm 86 on the rotor 80, and the gear train 76 is so designed that it will cause the rotor 80 to move one-tenth of a revolution for each thousand miles traveled by the vehicle. The arms 84 are 180° apart and the arm 86 is positioned 90° from the arms 84.

Mounted within the housing below the shaft 74 is a horizontally extending supporting bar 88 on which are rockably supported upwardly extending levers 90, 92 and 94, the upper ends of which are in the paths of rotation of the arms 82, 84 and 86, respectively. The lower ends of the levers 90, 92 and 94 are recessed, as at 96, for the reception of the upper ends of compression coil springs 98, the lower ends of which are received in sockets 100 formed in the bottom wall of the housing 52. Carried by the levers 90, 92 and 94, respectively, are laterally extending arms 102, 104 and 106, respectively, which extend through vertically extending, elongated slots 108, 110 and 112 formed in the front wall of the housing 52 to provide for manual resetting of the levers after they have been tripped by the arms of the rotor 80.

Secured to the bottom wall of the housing 52 adjacent the recesses 100 therein is a strip 114 of non-conducting material, such as rubber, and embedded in said strip 114 is a strip 116 of conducting material, such as bronze. Upwardly extending, spaced spring tongues 118, 120 and 122 are secured in any suitable manner to the strip 116 and carry laterally extending arms 124, 126 and 128, respectively, which lie in the paths of movement, respectively, of the levers 90, 92 and 94, so that when a lever is tripped by a related arm on the rotor 80, the corresponding spring tongue will be depressed.

Carried by the strip 114 of insulating material are spaced, upwardly extending contact arms 130, 132 and 134 which lie in the paths of movement, respectively, of the spring tongues 118, 120 and 122, so that when a tongue is depressed electrical contact will be made with a related contact arm. The conductors 46, 48 and 50 are respectively coupled to the contact arms 130, 132 and 134, thus providing a group of circuit closers which, when the spring tongues are depressed, will close an electrical circuit through the lamps 38, 40 and 42.

The strip 116 is electrically connected by a conductor 136 to the conventional ignition switch 138 of the vehicle which in turn is connected by a conductor 140 to one terminal of the power source 142 of the vehicle. The opposite terminal of the power source 142 is conventionally grounded, as at 144.

In installing the device on a vehicle, the housing 52 is attached to the dashboard 10 in any conventional manner, and the speedometer shaft 18 is disconnected from the speedometer 14 and coupled to the nipple 54 of the housing 52, thus establishing driving connection between the traction wheels of the vehicle and the shaft 64. A relative short length of speedometer cable 146 is then connected to the nipple 60 of the housing 52 and to the nipple 16 of the speedometer 14, thus establishing driving connection between the shaft 64 and the speedometer. With the bracket 24 clamped on the flange 20 of the instrument board 12 in front of the driver of the vehicle, it will be evident that as the lamp carried by the bracket 24 becomes lighted, its rays will shine through one of the colored disks or lenses carried by the flange 26, thus giving the operator a visual signal that a service is due. By using different colors for the disks or lenses, there will be produced a visual indication of the type of service required.

What is claimed is:

A circuit closer for a service indicator, a support, a rotary shaft mounted on the support, a drum fixed on the shaft and having a radially projecting arm, a lever pivoted on the support on an axis parallel to the axis of said shaft, said lever having a first arm extending toward said drum and a second arm extending laterally with respect to said first arm, spring means acting between said lever and the support, said spring means serving to yieldably maintain said lever in a first over-center position in which said first arm is in the path of movement of said drum arm or in a second over-center position in which said first lever arm is out of the path of movement of the drum arm, said second lever arm serving as manual means for moving said lever to either of said over-center positions, normally open circuit closing means on said support having an element arranged to be engaged and moved by said first lever arm as said lever is moved from said first position to said second position to operate the circuit closer to closed position, and means for rotating said shaft, said circuit closing means comprising a stationary contact and a spring retracted movable contact, normally out of engagement with the stationary contact, said spring retracted movable contact comprising said element.

MARTHA M. CLARK.
ROYAL E. HANSEN.

References Cited in the file of this patent

UNITED STATES PATENTS

| Number | Name | Date |
| --- | --- | --- |
| 1,462,354 | Pero | July 17, 1923 |
| 2,492,408 | Wilcox | Dec. 27, 1949 |

FOREIGN PATENTS

| Number | Country | Date |
| --- | --- | --- |
| 152,747 | Switzerland | May 2, 1932 |